United States Patent
Kawasaki et al.

(10) Patent No.: US 9,831,644 B2
(45) Date of Patent: Nov. 28, 2017

(54) CONNECTION STRUCTURE BETWEEN MAIN TRANSFORMER AND HIGH-VOLTAGE DEVICE BOX AND RAILCAR INCLUDING SAME

(71) Applicant: KAWASAKI JUKOGYO KABUSHIKI KAISHA, Kobe-shi, Hyogo (JP)

(72) Inventors: Hiroyuki Kawasaki, Kobe (JP); Hiroyuki Sakurai, Kobe (JP); Ryoji Negi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 333 days.

(21) Appl. No.: 14/414,545

(22) PCT Filed: Jul. 10, 2013

(86) PCT No.: PCT/JP2013/004265
§ 371 (c)(1),
(2) Date: Jan. 13, 2015

(87) PCT Pub. No.: WO2014/010240
PCT Pub. Date: Jan. 16, 2014

(65) Prior Publication Data
US 2015/0171604 A1    Jun. 18, 2015

(30) Foreign Application Priority Data

Jul. 13, 2012 (JP) ................................. 2012-157457

(51) Int. Cl.
*B61G 5/10* (2006.01)
*H02B 1/46* (2006.01)
(Continued)

(52) U.S. Cl.
CPC .............. *H02B 1/46* (2013.01); *B60L 3/0069* (2013.01); *B60L 3/04* (2013.01); *B60L 9/24* (2013.01);
(Continued)

(58) Field of Classification Search
CPC .............. B60L 1/00; B61G 5/10; B61C 17/12
(Continued)

(56) References Cited

U.S. PATENT DOCUMENTS 3,861,777 A * 1/1975 Clark ................... H01B 17/301
174/152 R
5,114,357 A   5/1992 Luzzi
(Continued)

FOREIGN PATENT DOCUMENTS

CN    102398531 A    4/2012
EP    0 551 554 A1   7/1993
(Continued)

OTHER PUBLICATIONS

Jun. 18, 2015 Office Action issued in Taiwanese Application No. 102124877.
(Continued)

*Primary Examiner* — Daniel Kessie
(74) *Attorney, Agent, or Firm* — Oliff PLC

(57) ABSTRACT

A connection structure includes: a circuit breaker connected to a power cable through which high-voltage power is supplied; a high-voltage device box accommodating the circuit breaker; a main transformer configured to transform a voltage of the high-voltage power and provided under the floor of the car; a first connector device electrically connected to the circuit breaker and provided at a dividing wall of the high-voltage device box; a second connector device electrically connected to the main transformer and provided at a dividing wall of the main transformer; and a high- (Continued)

voltage cable covered with an insulating coating and having both end portions to which cable connector portions are respectively attached, wherein the high-voltage cable connects the first connector device and the second connector device in such a manner that the cable connector portions respectively fit and are connected to the first connector device and the second connector device.

8 Claims, 5 Drawing Sheets

(51) Int. Cl.
*B60L 9/24* (2006.01)
*B60L 3/00* (2006.01)
*B60L 3/04* (2006.01)
*H02G 15/04* (2006.01)
*B61C 17/12* (2006.01)
*H02G 15/02* (2006.01)
*H02B 13/00* (2006.01)
*B61C 3/00* (2006.01)
*H01R 4/56* (2006.01)

(52) U.S. Cl.
CPC ............ *B61C 3/00* (2013.01); *B61C 17/12* (2013.01); *B61G 5/10* (2013.01); *H02B 13/005* (2013.01); *H02G 15/02* (2013.01); *H02G 15/046* (2013.01); *B60L 2200/26* (2013.01); *B60L 2250/16* (2013.01); *B60L 2260/28* (2013.01); *B60L 2270/145* (2013.01); *H01R 4/56* (2013.01)

(58) Field of Classification Search
USPC .................................. 174/24; 307/10.1, 9.1
See application file for complete search history.

(56) References Cited

U.S. PATENT DOCUMENTS

| | | | | |
|---|---|---|---|---|
| 5,171,159 A * | 12/1992 | Byrne | ............. | H02G 3/288 439/211 |
| 5,675,194 A * | 10/1997 | Domigan | ............. | H02G 3/00 174/50 |
| 5,766,517 A * | 6/1998 | Goedde | ............. | H01F 27/12 252/570 |
| 5,834,696 A * | 11/1998 | Kurosawa | ............. | H01R 13/213 174/84 C |
| 6,634,303 B1 * | 10/2003 | Madsen | ............. | B60L 3/102 105/73 |
| 6,757,589 B1 * | 6/2004 | Parker | ............. | F16K 37/0075 137/624.11 |
| 7,104,823 B2 * | 9/2006 | Jazowski | ............. | H01R 13/53 439/181 |
| 7,344,392 B2 * | 3/2008 | Rubin | ............. | H01R 25/003 439/108 |
| 7,661,979 B2 * | 2/2010 | Hughes | ............. | H01R 13/53 174/84 R |
| 8,109,776 B2 * | 2/2012 | Hughes | ............. | H01R 13/46 439/282 |
| 8,701,809 B2 * | 4/2014 | Ikemoto | ............. | B60L 3/0046 180/65.265 |
| 2002/0139629 A1 * | 10/2002 | Nogaret | ............. | B60L 9/22 191/2 |
| 2005/0068708 A1 * | 3/2005 | Prelec | ............. | H01T 1/00 361/117 |
| 2007/0141882 A1 * | 6/2007 | Stepniak | ............. | G01R 15/16 439/187 |
| 2008/0231289 A1 * | 9/2008 | Ganesh | ............. | G01R 31/1272 324/539 |
| 2010/0038228 A1 * | 2/2010 | Heres | ............. | H01H 33/55 200/81 R |
| 2012/0212048 A1 * | 8/2012 | D'Ascanio | ............. | H02G 9/02 307/11 |

FOREIGN PATENT DOCUMENTS

| | | | |
|---|---|---|---|
| JP | S5929351 U | | 2/1984 |
| JP | S6360378 A | | 3/1988 |
| JP | H05258966 A | | 10/1993 |
| JP | 2003331980 A | | 11/2003 |
| JP | 2009136142 A | * | 6/2009 |
| JP | 2012050162 A | | 3/2012 |
| TW | 224184 B | | 5/1994 |
| WO | 2009/126580 A2 | | 10/2009 |

OTHER PUBLICATIONS

Jan. 6, 2016 Office Action issued in Chinese Patent Application No. 201380030744.1.
Jun. 1, 2016 Extended Search Report issued in European Patent Application No. 13816265.6.
"NTV gears up to launch in 2011", Railway Gazette International, Reed Business Information, Jul. 1, 2010, vol. 166, No. 7, pp. 54-57.
Oct. 1, 2013 International Search Report issued in International Application No. PCT/JP2013/004265.

* cited by examiner

CONNECTION STRUCTURE BETWEEN MAIN TRANSFORMER AND HIGH-VOLTAGE DEVICE BOX AND RAILCAR INCLUDING SAME

TECHNICAL FIELD

The present invention relates to a connection structure between a main transformer and a high-voltage device box and a railcar including the connection structure.

BACKGROUND ART

In conventional railcars, various devices, such as a main electric motor, a main transformer, a circuit breaker, an arrester (lightning arrester), a main converter, and an air compressor, are provided under a floor of the railcar.

For example, in the railcar described in PTL 1, a pantograph is provided on a roof of a car, and a vacuum circuit breaker (circuit breaker), an arrester, a main transformer, a main converter, a main electric motor, and the like are provided under a floor of the car. Power collected by the pantograph is supplied to respective devices through a power cable extending from on the roof to under the floor. Especially, in the railcar that travels at a comparatively high speed, in order to lower the center of gravity and reduce noises in consideration of the increase in speed, many devices, such as a power supply unit, an auxiliary device, and an air conditioner, and cables connecting these devices are provided under the floor in addition to the above devices.

Further, in PTL 2, the electrical connection between the main transformer and the high-voltage device box provided under the floor of the car is realized by electric wires and the like. The electric wires are covered with simple coatings for preventing damages during work. Therefore, an insulating protective tube is provided for the purpose of protecting the electric wires and the like from rain water and dust and preventing accidents, such as electric shock. FIG. 9 is a diagram showing the connection structure between the high-voltage device box and the main transformer, the connection structure using the insulating protective tube. A reference sign 13 shows a circuit breaker. A reference sign 18 shows an insulator type cable head of a power cable 270 extending from on the roof. A reference sign 12 shows a high-voltage device box accommodating the circuit breaker 13. A reference sign 20 shows a main transformer. A reference sign 6 shows an insulating protective tube. A reference sign 15 shows a connection electric wire connecting the circuit breaker 13 and the insulator type cable head 18.

The power collected by the pantograph flows from the power cable 270 to the circuit breaker 13. Then, the power is supplied to the main transformer 20 through a connection electric wire 16 and a high-voltage insulator (not shown) protected by the insulating protective tube 6. Since the insulating protective tube 6 prevents electric shock by securing an insulation distance between the insulating protective tube 6 and the connection electric wire 16, it is comparatively large in size. Further, since the insulating protective tube 6 is made of metal, it is large in mass. The insulating protective tube 6 is fixed to the high-voltage device box 12 and the main transformer 20 by a plurality of bolts, screws, and the like and is sealed by applying putty for preventing intrusion of rain water and dust. When manufacturing and maintaining the car, a worker gets under the car and faces upward to perform work of attaching and detaching the insulating protective tube 6. Further, the work of attaching and detaching the circuit breaker 13 and the connection electric wire 16 is performed by using a tool or the like through an inspection lid (not shown) provided at the high-voltage device box 12.

CITATION LIST

Patent Literature

PTL 1: Japanese Laid-Open Patent Application Publication No. 2009-136142
PTL 2: Japanese Examined Utility Model Application Publication No. 59-29351

SUMMARY OF INVENTION

Technical Problem

The connection structure described in PTL 2 uses the insulating protective tube that is large in size and mass. Therefore, problems are that the workability of the work of attaching and detaching the insulating protective tube 6 when manufacturing and maintaining the car is low, and the workability of the work of attaching and detaching the circuit breaker 13 and the connection electric wire 16 is low.

Since the main transformer 20 vibrates due to electromagnetic vibrations and the like in addition to vibrations generated when the car travels, a vibration characteristic of the high-voltage device box 12 and a vibration characteristic of the main transformer 20 are different from each other. Therefore, a distance between the high-voltage device box 12 and the main transformer 20 in each of a car longitudinal direction, a car width direction, and a vertical direction changes at all times while the car is traveling. Thus, relative positions of the high-voltage device box 12 and the main transformer 20 change. In the connection structure described in PTL 2, the insulating protective tube 6 can slide in the car width direction, but its slide width is small. In addition, the insulating protective tube 6 has a structure incapable of following the changes of the relative positions due to the vibrations in the car longitudinal direction and the vertical direction. Therefore, the putty for the sealing crack.

In the connection structure described in PTL 2, a relative positional relation between the main transformer 20 and the high-voltage device box 12 becomes substantially constant depending on the size of the insulating protective tube 6. In the railcar described in PTL 1, since a space under the floor of the car is narrow, the layout of underfloor devices, such as the high-voltage device box 12 and the main transformer 20, are substantially, naturally determined, so that it is difficult to efficiently provide the underfloor devices.

Further, in the connection structure described in PTL 2, in a case where the installation position of the insulating protective tube 6 relative to the main transformer 20 (the high-voltage device box 12) is lowered, the position of a lower surface of the high-voltage device box 12 (the main transformer 20) is also lowered, and this cause a problem regarding a car gauge. In a case where the problem regarding the car gauge occurs, the main transformer 20, the high-voltage device box 12, and the devices accommodated in the high-voltage device box 12 need to be redesigned, and the installation position of the insulating protective tube 6 relative to the main transformer 20 (the high-voltage device box 12) needs to be changed.

Here, objects of the present invention are to achieve, regarding a connection structure between a main transformer and a high-voltage device box provided under a floor of a railcar, an improvement of workability of attaching and detaching work and the like, an improvement of followability to changes in relative positions of the main transformer and the high-voltage device box due to vibrations, an improvement of the degree of freedom of the layout of underfloor devices, an improvement of the degree of freedom of designs of the main transformer and the high-voltage device box, and commonality of designs of the main transformer and the high-voltage device box.

Solution to Problem

A connection structure between a main transformer and a high-voltage device box according to the present invention includes: a circuit breaker connected to a power cable through which high-voltage power is supplied, the high-voltage power being collected through an overhead contact line by a power collector provided on a roof of a car; a high-voltage device box accommodating the circuit breaker and provided under a floor of the car; a main transformer configured to transform a voltage of the high-voltage power and provided under the floor of the car; a first connector device electrically connected to the circuit breaker and provided at a dividing wall of the high-voltage device box; a second connector device electrically connected to the main transformer and provided at a dividing wall of the main transformer; and a high-voltage cable covered with an insulating coating and having both end portions to which cable connector portions are respectively attached, wherein the high-voltage cable connects the first connector device and the second connector device in such a manner that the cable connector portions respectively fit and are connected to the first connector device and the second connector device.

According to the above configuration, since the main transformer and the high-voltage device box are connected to each other by the high-voltage cable through the connector devices, the workability of the work of, for example, attaching and detaching the high-voltage cable and the followability to the changes in the relative positions of the main transformer and the high-voltage device box due to vibrations can be improved.

Advantageous Effects of Invention

As is clear from the above explanations, according to the present invention, regarding the connection structure between the main transformer and the high-voltage device box provided under the floor of the railcar, the workability of, for example, the attaching and detaching work can be improved, and the followability to the changes in the relative positions of the main transformer and the high-voltage device box due to vibrations can be improved. Further, the degree of freedom of the layout of the underfloor devices is improved, and the degree of freedom of the designs of the main transformer and the high-voltage device box is improved. Furthermore, the components can be commonalized.

DESCRIPTION OF EMBODIMENTS

Hereinafter, an embodiment will be explained in reference to the drawings.

Embodiment

Figure 1:
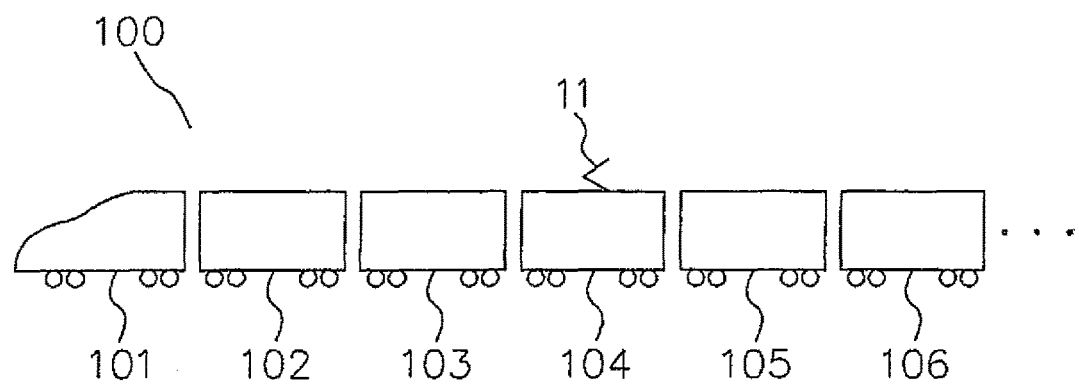
FIG. 1 is a side view schematically showing a railcar according to an embodiment.

FIG. 1 is a side view schematically showing a railcar 100. As shown in FIG. 1, in the railcar 100, a plurality of cars 101 to 108 (seventh and eighth cars are not shown) are coupled to one another. Each of the cars 102 to 107 other than both front cars (first and eighth cars) is provided with main electric motors 22 (see FIG. 2) for travel drive, a main transformer 20, a high-voltage device box 12, a main converter 21, and the like. A power collector 11 (pantograph) is provided on a roof of the fourth car 104. The railcar including eight cars is shown as one example. However, the number of cars and the arrangement of respective devices, such as the main electric motors and the pantograph, are not limited to the above.

AC power of 25 kV obtained through an overhead contact line by the power collector 11 is supplied through a power cable 270, a circuit breaker 13, a high-voltage cable 70, and the like to the main transformer 20 to be, for example, transformed. Then, the AC power is supplied to the main electric motors 22 mounted on the fourth car 104. With this, the main electric motors 22 drive to rotate drive wheels, so that the entire railcar 100 travels. The voltage of the AC power supplied through the overhead contact line is 25 kV but is not limited to this, and the present embodiment is applicable to any electrification system adopted in respective regions.

Bogies that support a carbody are provided under a floor of each of the cars 101 to 108. In FIG. 1, only the wheels are shown for simplicity, and the bogies (bogie frames) are not shown. However, actually, as can be understood from the wheels shown, the bogie including front and rear axles and four wheels is provided at each of front and rear portions of each of the cars 101 to 107. The structure of the bogie is not especially limited. However, the bogies of FIG. 1 are configured such that center portions thereof support the carbody.

Figure 2:
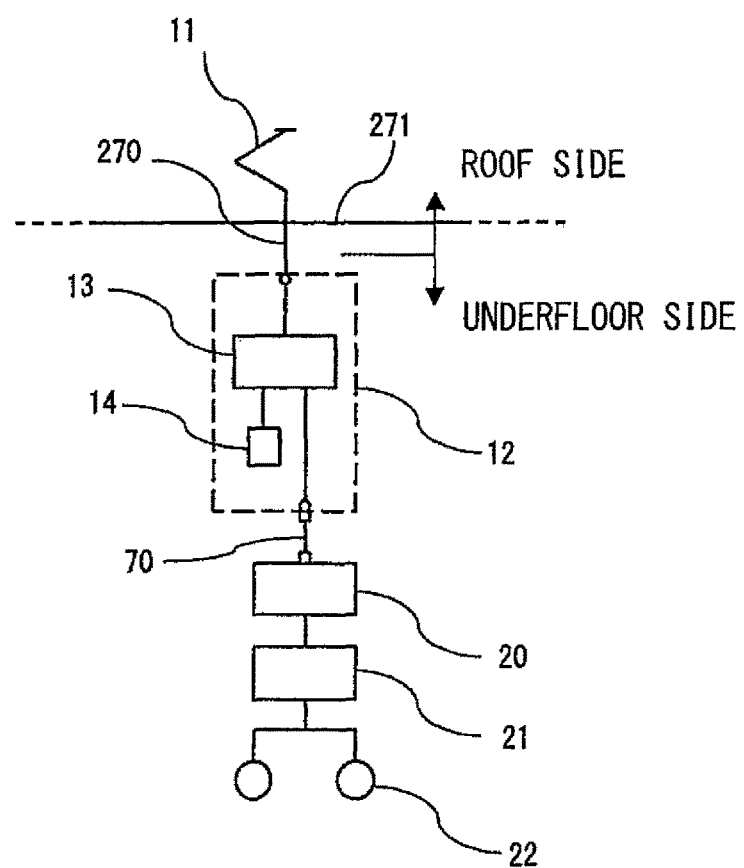
FIG. 2 is a schematic diagram showing an electric system of the railcar shown in FIG. 1.
Figure 3:
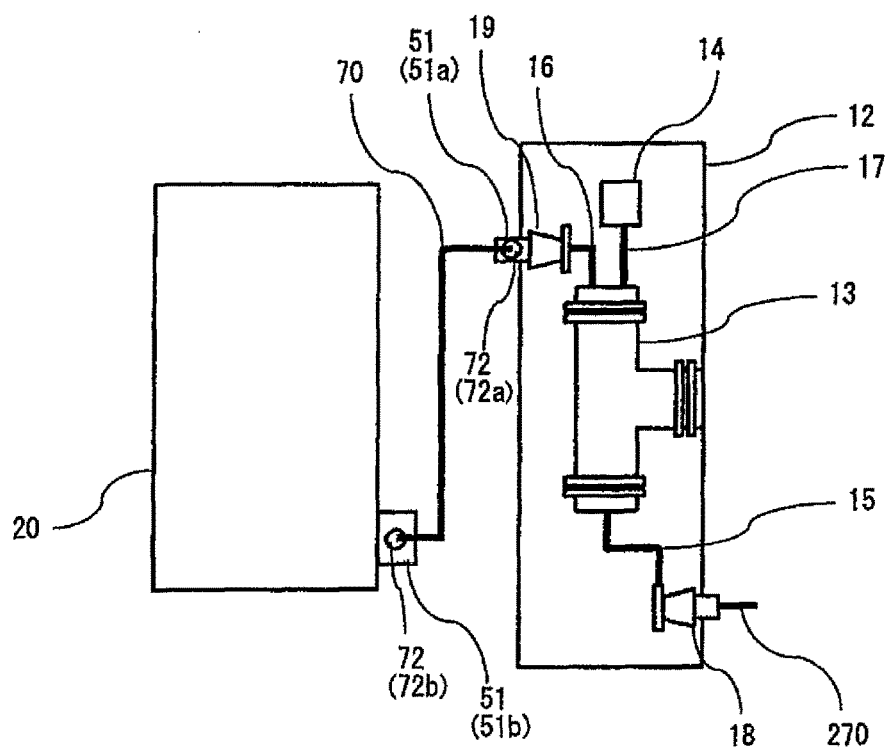
FIG. 3 is a plan view of a connection structure between a high-voltage device box and a main transformer according to the embodiment, when viewed from an outside of a car.

FIG. 2 is a schematic diagram showing an electric system of the railcar 100 shown in FIG. 1. FIG. 3 is a plan view showing a connection structure between the high-voltage device box 12 and the main transformer 20 according to the present embodiment, when viewed from an outside of the car (and from below). As shown in FIGS. 2 and 3, the fourth car 104 of the railcar 100 includes: the power collector 11 provided on the roof; the high-voltage device box 12 provided under the floor and accommodating the circuit breaker 13 and an arrester 14; and the main transformer 20. A high-voltage train line 271 is connected to the power collector 11 and is provided to extend on the roofs of the fourth car 104 and the other cars 102, 103, and 105 to 107. The power cable 270 is connected to the high-voltage train line 271, and the collected power is supplied to the devices provided under the floors of the cars 102 to 107. The power cable 270 is connected through a connection electric wire 15 and the like to the circuit breaker 13 (high voltage breaker) provided under the floor and constituted by a vacuum circuit breaker (VCB). The circuit breaker 13 and the arrester 14 (lightning arrester) are accommodated in the high-voltage device box 12 provided under the floor of the railcar 100. The circuit breaker 13 is connected to a circuit between the power collector 11 and the below-described main transformer 20 and breaks the circuit when an abnormality, such as electric leakage or overcurrent, is detected. The arrester 14 prevents dielectric breakdown of electric parts from occurring. Only when an abnormal current is generated by lightning strike or the like, the arrester 14 connects the circuit to earth to discharge electricity. In the present embodiment, the circuit breaker 13 is constituted by the vacuum circuit breaker (VCB). However, the type and the like of the circuit breaker 13 are not especially limited, and an air blast circuit breaker (ABB) be used. The voltage of the current having flowed through the circuit breaker 13 is lowered to a predetermined voltage value through the main transformer 20. Then, the frequency of the current is converted by the main converter 21, and the current flows to the main electric motors 22.

The insulator type cable head 18 of the power cable 270 is inserted into the high-voltage device box 12 provided under the floor of the car. In the high-voltage device box 12, the connection electric wire 15 connects the insulator type cable head 18 and one end of the circuit breaker 13. A connection electric wire 16 electrically connected to the main transformer 20 and a connection electric wire 17 electrically connected to the arrester 14 are connected to the other end of the circuit breaker 13. The connection electric wires 15 to 17 are covered with simple coatings in order to prevent damages and the like at the time of attaching work and the like. The coatings of the connection electric wires 15 to 17 are designed so as not to exhibit insulation functions when the above-described high-voltage current flows. The coatings have flexibility in consideration of workability. Normally, a single phase AC having an extremely high voltage of 25 kV flows through the connection electric wires 15 to 17. Therefore, an adequate insulation distance needs to be secured between each of dividing walls constituting the high-voltage device box 12 and each of the connection electric wires 15 to 17, so that the high-voltage device box 12 becomes comparatively large.

Figure 4A:
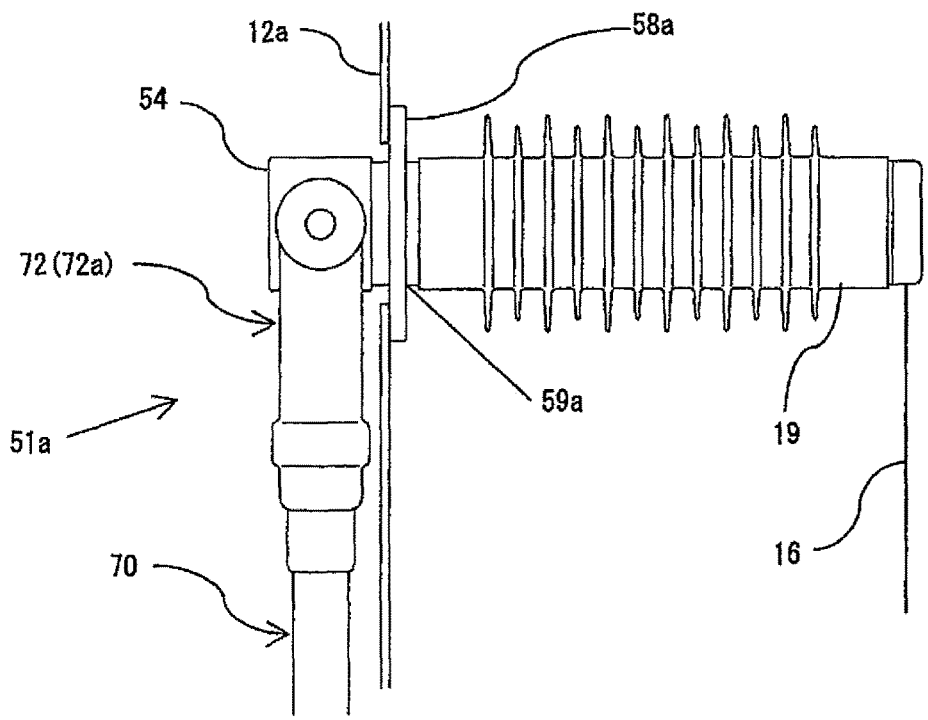
FIG. 4A is a plan view showing a connection portion between the high-voltage device box and a high-voltage cable according to the embodiment.
Figure 4B:
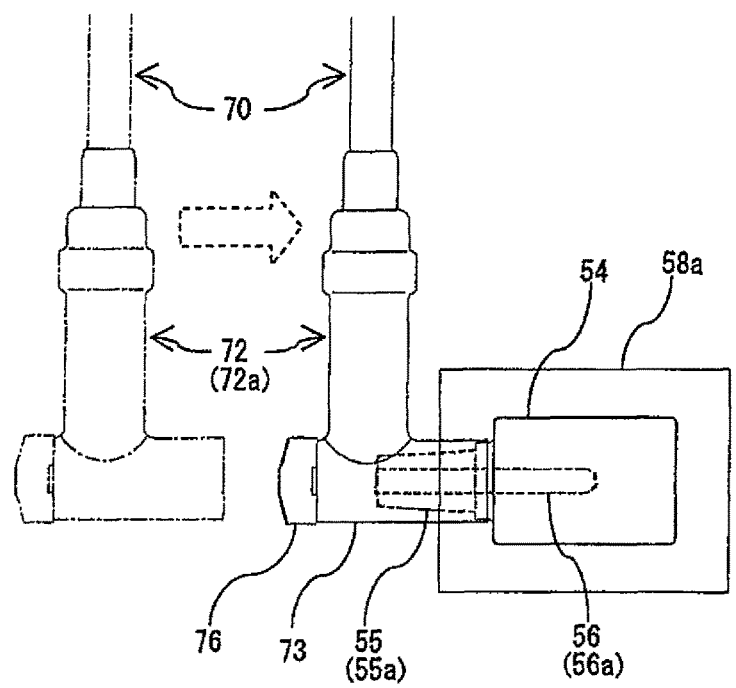
FIG. 4B is a side view showing the connection portion between the high-voltage device box and the high-voltage cable according to the embodiment.

FIG. 4A is a plan view showing a connection portion between the high-voltage device box 12 and the high-voltage cable 70 according to the present embodiment. FIG. 4B is a side view showing the connection portion between the high-voltage device box 12 and the high-voltage cable 70 according to the present embodiment. A first connector device 51a at the high-voltage device box 12 side is mainly constituted by: a base portion 54 made of a hard insulating material, such as epoxy resin; a joint connector portion 55a connected to the base portion 54 and made of a hard insulating material, such as epoxy resin; and an internal conductor 56a embedded in the base portion 54 and the joint connector portion 55a. The joint connector portion 55a has a convex shape formed in a tapered column shape and fits in a below-described cable connector portion 72. The base portion 54 penetrates through a through hole 59a of an attachment plate 58a, and an outer surface of the base portion 54 and the through hole 59a tightly contact each other. Further, the base portion 54 is fitted in an insulator 19. The attachment plate 58a is fixed to a high-voltage device box dividing wall 12a by bolts and the like. Thus, the base portion 54 is fixed at an outside of the high-voltage device box 12, and the insulator 19 is fixed at an inside of the high-voltage device box 12. The joint connector portion 55a projects downward from the base portion 54. The internal conductor 56a is exposed at a tip end of the joint connector portion 55a, and an internal thread 57 is formed at an exposed tip end portion of the internal conductor 56a. The internal conductor 56a is bent at a substantially right angle in the base portion 54 to be inserted into the insulator 19. The joint connector portion 55a of the first connector device 51a of the present embodiment projects downward from the base portion 54. However, the direction in which the joint connector portion 55a projects is not especially limited. The joint connector portion 55a project upward or in a horizontal direction from the base portion 54 depending on the layout of the devices. The insulator 19 is fixed to the inside of the high-voltage device box 12 but be fixed to the outside of the high-voltage device box 12.

Figure 5:
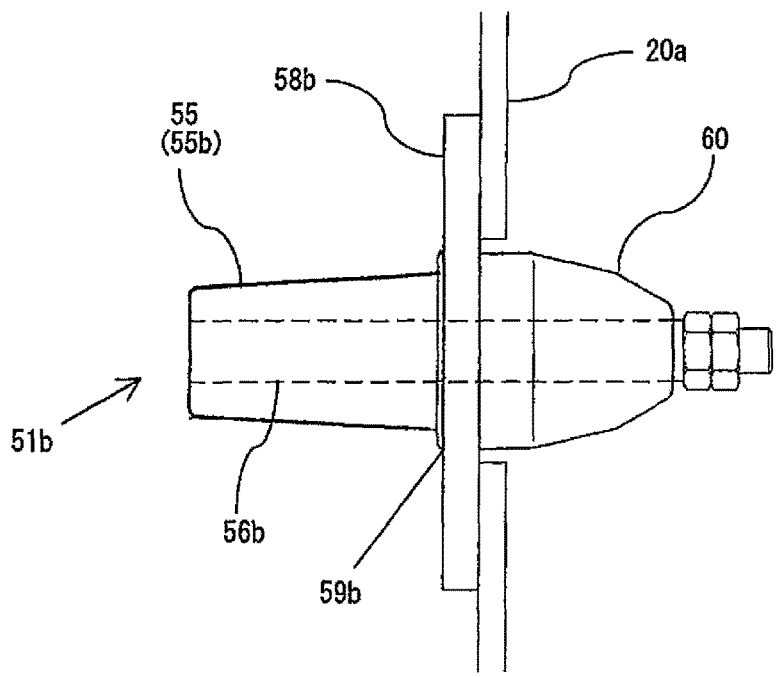
FIG. 5 is a side view showing the vicinity of a joint connector portion at the main transformer side according to the embodiment.

FIG. 5 is a side view showing the vicinity of the joint connector portion at the main transformer side according to the present embodiment. A second connector device 51b at the main transformer 20 side is mainly constituted by: a bushing portion 60 made of a hard insulating material, such as epoxy resin; a convex joint connector portion 55b formed integrally with the bushing portion 60; and an internal conductor 56b embedded in the bushing portion 60 and the joint connector portion 55b. The joint connector portion 55b is the same in configuration as the joint connector portion 55a. The bushing portion 60 penetrates through a through hole 59b of an attachment plate 58b, and an outer surface of the bushing portion 60 and the through hole 59b tightly contact each other. By fixing the attachment plate 58b to a main transformer dividing wall 20a by bolts and the like, the joint connector portion 55b is fixed at an outside of the main transformer 20, and the bushing portion 60 is fixed at an inside of the main transformer 20. The joint connector portion 55b projects downward from the main transformer dividing wall 20a. The internal conductor 56b is exposed at a tip end of the joint connector portion 55b, and the internal thread 57 is formed at an exposed tip end portion of the internal conductor 56b. The internal conductor 56b is inserted through the joint connector portion 55b and the bushing portion 60 to be connected to an inner portion of the main transformer 20. The second connector device 51b of the present embodiment is fixed to the main transformer dividing wall 20a such that the joint connector portion 55b projects downward. However, as with the joint connector portion 55a, the direction in which the joint connector portion 55b projects is not especially limited.

Figure 6:
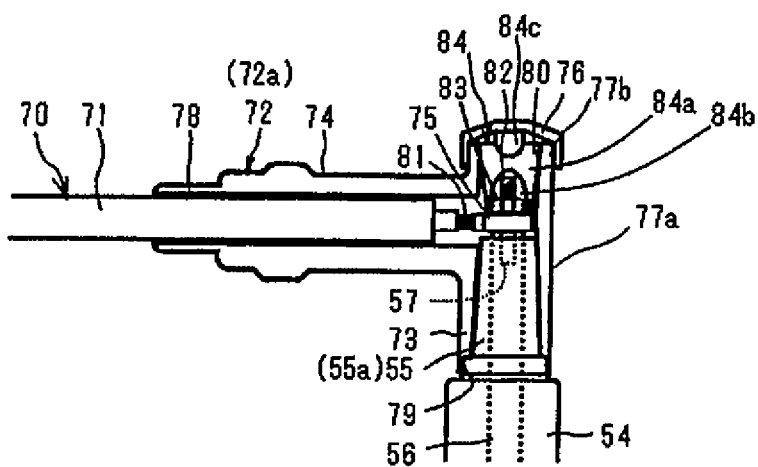
FIG. 6 is a partial cross-sectional plan view of a joint device according to the embodiment.
Figure 7:
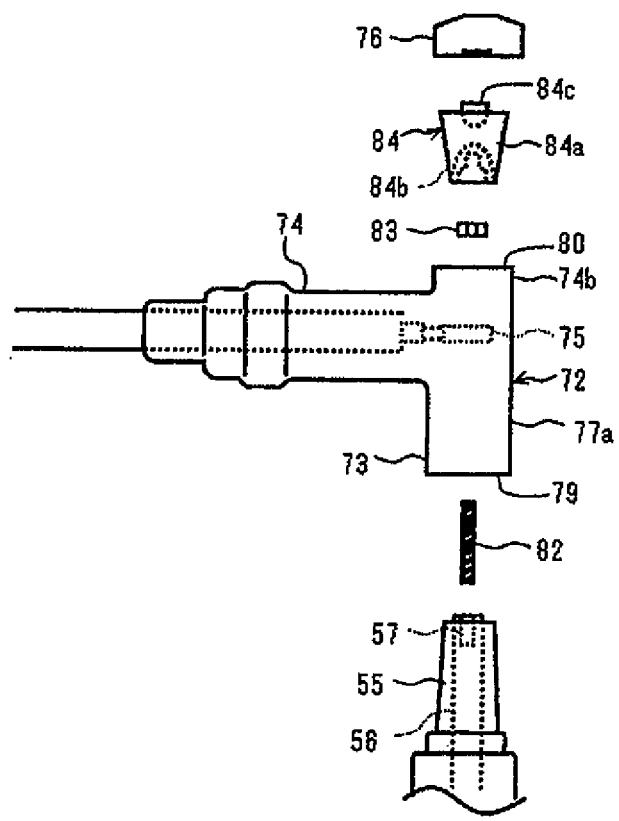
FIG. 7 is an exploded view showing the vicinities of the joint connector portion and a cable connector portion according to the embodiment.

The high-voltage cable 70 is a member which connects the circuit breaker 13 in the high-voltage device box 12 and the main transformer 20 and through which a high-voltage current flows. As shown in FIGS. 6 and 7, the high-voltage cable 70 is mainly constituted by a cable main body 71 and the cable connector portion 72 provided at a tip end portion of the cable main body 71. Regarding the high-voltage cable 70 and the power cable 270 used in the railcar 100, the cable main body 71 has an outer diameter of about 50 to 60 mm and is covered with a coating such that even when a high-voltage current flows through the cable main body 71, the cable main body 71 is insulated. The cable connector portion 72 includes a concave accommodating portion 73 so as to accommodate a joint connector portion 55.

The following will explain the cable connector portion 72 in more detail. The cable connector portion 72 is mainly constituted by a housing portion 74, a connecting terminal 75, a cap portion 76, and an insulating plug 84. The housing portion 74 includes: a cylindrical fit tubular portion 77a; a cylindrical base tubular portion 78 perpendicularly coupled to a side surface of the fit tubular portion 77a such that an inner portion of the base tubular portion 78 and an inner portion of the fit tubular portion 77a communicate with each other; and a work tubular portion 77b substantially perpendicular to the base tubular portion 78 and projecting in an opposite direction of the fit tubular portion 77a on the substantially same straight line as the fit tubular portion 77a. The entire housing portion 74 is formed in a T shape. One end of the fit tubular portion 77a constitutes a connector opening portion 79 into which the joint connector portion 55 is inserted. The connector opening portion 79 and its periphery constitute the concave accommodating portion 73. A work opening portion 80 that is open at an opposite side of the connector opening portion 79 is formed at the work tubular portion 77b. Further, the cable main body 71 whose tip end portion is stepwisely stripped in advance is inserted through the base tubular portion 78 toward the inner portion of the housing portion 74. The connecting terminal 75 is attached to the tip end of the cable main body 71. The housing portion 74 is made of an elastic insulating material, such as ethylene propylene rubber (EP rubber) or silicone rubber. Although not shown, an inner semi-conducting layer is formed at an inner periphery side of a middle portion of the housing portion 74 so as to cover the vicinity of the connecting terminal 75 and include an inner periphery side that is exposed. An outer semi-conducting layer is formed at an outer periphery of the housing portion 74.

The inner semi-conducting layer and the outer semi-conducting layer are formed integrally with the housing portion 74. The inner semi-conducting layer is made of semi-conducting ethylene propylene rubber (EP rubber) or semi-conducting silicone rubber, and the outer semi-conducting layer is made of semi-conducting or conductive paint, semi-conducting ethylene propylene rubber (EP rubber), or semi-conducting silicone rubber. The connecting terminal 75 is joined to a cable conductor 81 of the cable main body 71 by compression and is located in the housing portion 74 (fit tubular portion 77a). The compressed portion of the connecting terminal 75 is formed in a circular shape, and a tip end portion thereof is formed in a plate shape. The insulating plug 84 includes: an insulating plug main body 84a made of a hard insulating material, such as epoxy resin; a fixing embedded metal fitting 84b provided at a tip end side of the insulating plug main body 84a and embedded in the insulating plug main body 84a such that a tip end surface thereof is exposed; and a work embedded metal fitting 84c provided at a rear end side of the insulating plug main body 84a (at a side to which the cap portion 76 is attached) and embedded in the insulating plug main body 84a such that a rear end portion thereof is exposed. A groove that accommodates a nut member 83 and the internal thread 57 for fixing an external thread member 82 are formed at a tip end portion of the fixing embedded metal fitting 84b. After the insulating plug 84 is fitted in the work opening portion 80 of the work tubular portion 77b, the cap portion 76 is attached to close the work opening portion 80. Both the cap portion 76 and the insulating plug 84 are detachable. Both the housing portion 74 and the cap portion 76 are made of an elastic insulating material. The plate-shaped portion of the tip end of the connecting terminal 75 is fixed so as to be exposed at the accommodating portion 73 of the fit tubular portion 77a such that the cable main body 71 and the cable connector portion 72 are integrated with each other.

In the embodiment, the cable connector portion 72 is a female connector, and the joint connector portion 55 is a male connector. However, these connectors be reversed. The present embodiment has explained the T-shaped housing portion 74 as the cable connector portion 72. However, an L-shaped housing which is not provided with the work opening portion 80, that is, which does not require the insulating plug 84 be adopted.

Next, the connection structure between the cable connector portion 72 and the first connector device 51a and the connection structure between the cable connector portion 72 and the second connector device 51b will be explained in reference to FIGS. 4A to 7. As described above, the first connector device 51a and the second connector device 51b respectively include the joint connector portions 55 that are the same in configuration as each other. The high-voltage device box 12 is electrically connected to the high-voltage cable 70 in such a manner that the internal conductor 56 is inserted through the joint connector portion 55 and the base portion 54. The main transformer 20 is electrically connected to the high-voltage cable 70 in the same manner as above except that the internal conductor 56 is inserted through the joint connector portion 55 and the bushing portion (second base portion) 60. Therefore, the following will explain a method of attaching the high-voltage cable 70 and the high-voltage device box 12. FIG. 7 is an exploded view showing the vicinities of the joint connector portion 55a and the cable connector portion 72a according to the present embodiment.

First, the external thread member 82 is attached to the joint connector portion 55a. Specifically, the external thread member 82 made of metal is threadedly engaged with the internal thread 57 formed at the tip end portion of the internal conductor 56 of the joint connector portion 55a. A length of the external thread member 82 is larger than a depth of the internal thread 57 formed at the internal conductor 56. Therefore, when one end of the external thread member 82 is threadedly engaged with the internal thread 57, a part of the other end of the external thread member 82 projects from the joint connector portion 55a.

Next, the cable connector portion 72a fits the joint connector portion 55a. A direction in which the housing portion 74 of the cable connector portion 72a fits the joint connector portion 55a is not a longitudinal direction of the high-voltage cable 70 but a direction substantially perpendicular to the longitudinal direction of the high-voltage cable 70 (see FIG. 4B). More specifically, the joint connector portion 55a is accommodated in the accommodating portion 73 of the fit tubular portion 77a by covering the joint connector portion 55a with the housing portion 74 from a tip end of the joint connector portion 55a. In this case, the external thread member 82 projecting from the joint connector portion 55a penetrates through a through hole 75a of the connecting terminal 75 fixed in advance so as to be exposed inside the accommodating portion 73 of the fit tubular portion 77a.

Next, the nut member 83 made of metal is inserted through the work opening portion 80 formed at the work tubular portion 77b of the housing portion 74. In order to fix the connecting terminal 75 to the internal conductor 56, the nut member 83 is tightened onto the external thread member 82 penetrating the connecting terminal 75. Then, the insulating plug 84 is attached to the work tubular portion 77b. Since this work can be performed through the work opening portion 80, the workability is extremely high.

At last, the cap portion 76 fits the work opening portion 80 to close the work opening portion 80. With this, the connection between the high-voltage cable 70 and the joint connector portion 55a is completed. As above, in the connection structure between the high-voltage device box 12 and the main transformer 20 according to the present embodiment, the high-voltage cable 70 is attached to the connector device 51 in such a manner that the cable connector portion 72 fits the joint connector portion 55 toward the direction substantially perpendicular to the longitudinal direction of the high-voltage cable 70.

According to the configuration explained above, the distance between the high-voltage device box 12 and the main transformer 20 can be reduced, so that a device occupation area in plan view can be reduced. Even if the changes in the relative positions of the high-voltage device box 12 and the main transformer 20 become large, the high-voltage device box 12 and the main transformer 20 can be easily, electrically connected to each other. Thus, the degree of freedom of the designs of the high-voltage device box 12 and the main transformer 20 can be improved. In consideration of the arrangement of the underfloor devices, such as the main converter 21 and the main electric motors 22, the high-voltage device box 12 and the main transformer 20 can be arranged so as to be separated from each other. Thus, the degree of freedom of the layout of the underfloor devices improves, so that the devices can be arranged in consideration of the weight balance. Since the housing portions 74 of the cable connector portions 72 are the same in shape as each other, the components can be commonalized. Further, it becomes unnecessary to fix the insulating protective tube 6, which was necessary in conventional structures, by a plurality of bolts and the like, seal the insulating protective tube 6 using putty or the like, and attach and detach the connection electric wire 16 to and from the circuit breaker 13. Therefore, the work of attaching and detaching the high-voltage cable 70, dust prevention work, and waterproofing work when manufacturing and maintaining the car are facilitated.

In the present embodiment, the power cable 270 extending from on the roof and the high-voltage device box 12 are connected to each other in such a manner that: the insulator type cable head 18 of the power cable 270 is inserted into the high-voltage device box 12; and the power cable 270 is electrically connected to the circuit breaker 13 through the connection electric wire 15. However, a joint device having the same structure as the present embodiment be configured.

Figure 8:
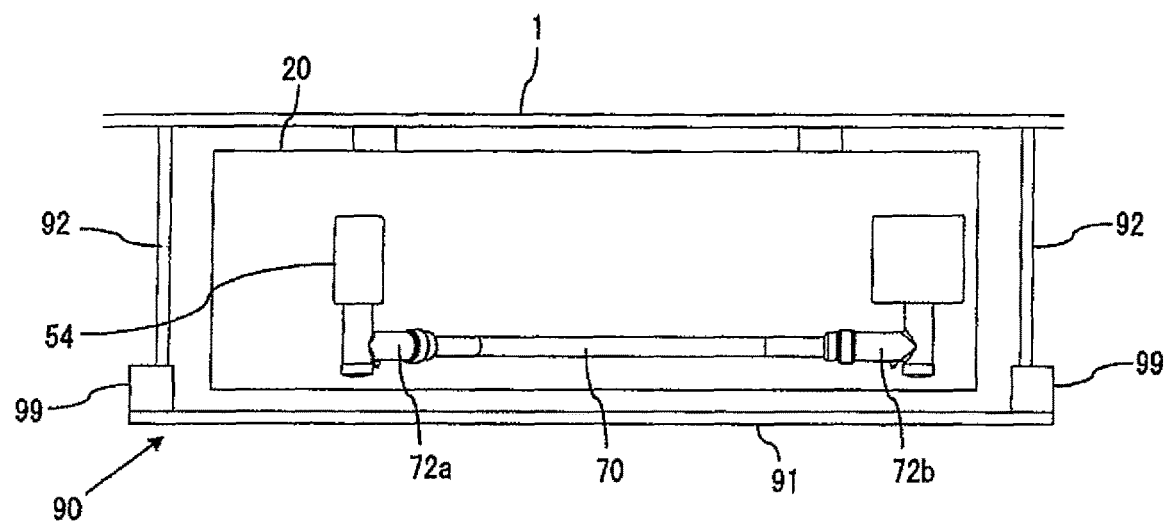
FIG. 8 is a side view showing an underfloor closing member and locking devices according to the embodiment.
Figure 9:
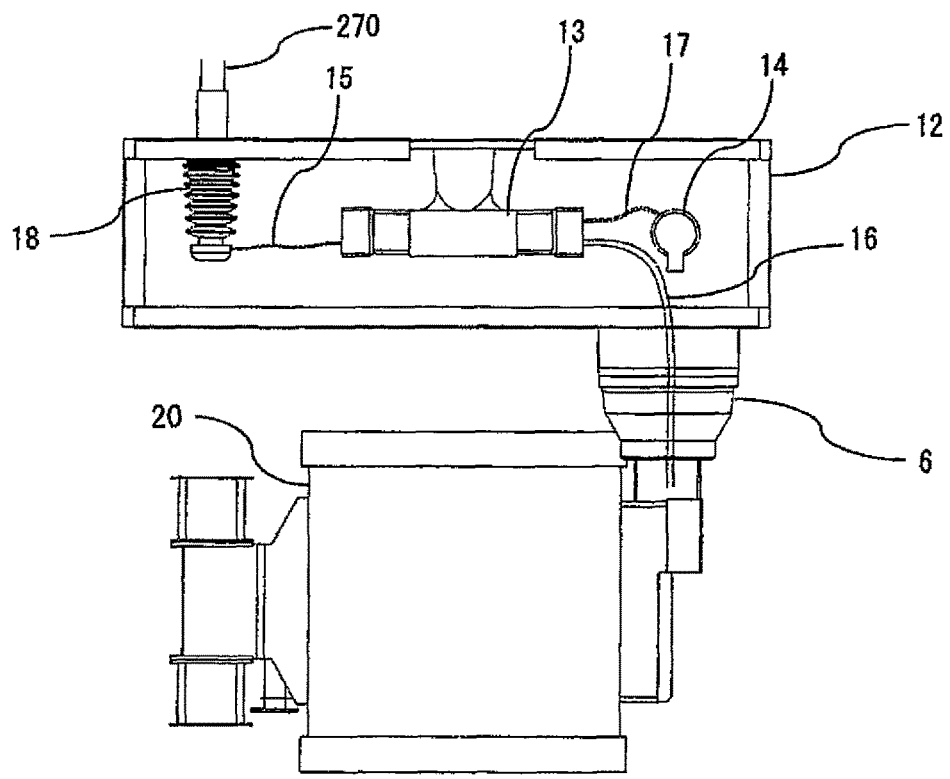
FIG. 9 is a plan view showing a conventional connection structure between the high-voltage device box and the main transformer.

FIG. 8 is a side view showing an underfloor closing member and locking devices. Since the high-voltage device box 12 and the main transformer 20 overlap each other, the high-voltage device box 12 is not shown in FIG. 8. In FIG. 8, a reference sign 90 shows the underfloor closing member that covers lower surfaces of the high-voltage device box 12, the main transformer 20, and the high-voltage cable 70. Without detaching the underfloor closing member 90, the high-voltage cable 70 cannot be attached to or detached from the high-voltage device box 12 and the main transformer 20. Locking devices 99 are provided at the underfloor closing member 90. In a case where the power collector 11 is in a state capable of collecting power through the overhead contact line, the locking devices 99 are in a locked state. The locking devices 99 can be unlocked by, for example, a tool that can be taken out from a predetermined position only when the power collector 11 is lowered. In the present embodiment, the underfloor closing member 90 is constituted by: a lower surface member 91 that entirely covers the lower surfaces of the high-voltage device box 12, the main transformer 20, and the high-voltage cable 70; and a side surface member (fixing member) 92 that covers side surfaces of the high-voltage device box 12, the main transformer 20, and the high-voltage cable 70, and the side surface member 92 is attached to car floor structural members 1 (such as cross beams, side sills, and cross girders). However, the present embodiment is not limited to this. The present embodiment is only required to be configured such that in a case where the locking devices 99 are unlocked, and the underfloor closing member 90 is detached, the high-voltage cable 70 can be attached to and detached from the high-voltage device box 12 and the main transformer 20. Therefore, the side surface member 92 be attached to the high-voltage device box 12 and the main transformer 20, and/or the lower surface member 91 be directly attached to the high-voltage device box 12 and the main transformer 20. The lower surface member 91 and the side surface member 92 be constituted by mesh members, angle bars, or the like instead of the plate-shaped members.

According to the configuration explained above, electric shock accidents when attaching and detaching the high-voltage cable 70 can be prevented. In addition, the damages of the high-voltage cable 70 by flying stones when the car travels can be prevented.

INDUSTRIAL APPLICABILITY

The connection structure between the main transformer and the high-voltage device box in the railcar according to the present invention is suitable for not only high-speed railcars, such as Shinkansen (registered trademark in Japan), but also various railcars including the main transformer and the high-voltage device box. Since the high-voltage device box and the main transformer can be efficiently connected to each other in a limited space under the floor of the railcar, the present invention has an excellent effect of being able to improve the degree of freedom of the layout of the underfloor devices. Therefore, it is useful to widely apply the present invention to railcars that can utilize the significance of the above effect.

REFERENCE SIGNS LIST 6 insulating protective tube
11 power collector
12 high-voltage device box
13 circuit breaker
14 arrester (lightning arrester)
20 main transformer
51a first connector device
51b second connector device
54 base portion (first base portion)
55, 55a, 55b joint connector portion
56a, 56b internal conductor
60 bushing portion (second base portion)
70 high-voltage cable
72, 72a cable connector portion
73 accommodating portion
74 housing portion
75 connecting terminal
76 cap portion
77a fit tubular portion
77b work tubular portion 78 base tubular portion
80 work opening portion
81 cable conductor
84 insulating plug
90 underfloor closing member
91 lower surface member
92 side surface member (fixing member)
99 locking device
100 railcar
101 to 106 car

The invention claimed is:

1. A connection structure between a main transformer and a high-voltage device box, the connection structure comprising:
a circuit breaker connected to a power cable through which high-voltage power is supplied, the high-voltage power being collected through an overhead contact line by a power collector provided on a roof of a car;
the high-voltage device box accommodating the circuit breaker and being provided under a floor of the car;
the main transformer being configured to transform a voltage of the high-voltage power and being provided under the floor of the car;
a first connector device electrically connected to the circuit breaker and provided at a dividing wall of the high-voltage device box, the first connector device including
a first base portion electrically connected to the circuit breaker,
a first joint connector portion projecting from the first base portion, and
a first conductor embedded in the first base portion and the first joint connector portion and including a tip end exposed from the first joint connector portion;
a second connector device electrically connected to the main transformer and provided at a dividing wall of the main transformer, the second connector device including
a second base portion electrically connected to the main transformer,
a second joint connector portion projecting from the second base portion, and
a second conductor embedded in the second base portion and the second joint connector portion and including a tip end exposed from the second joint connector portion; and
a high-voltage cable covered with an insulating coating and having both end portions to which cable connector portions are respectively attached, wherein
the high-voltage cable connects the first connector device and the second connector device in such a manner that the cable connector portions respectively fit and are connected to the first connector device and the second connector device, wherein
each of the cable connector portions includes a housing portion,
each of the housing portions includes
a fit tubular portion including a fit opening whose fit direction is a direction substantially perpendicular to a longitudinal direction of the high-voltage cable, and
a base tubular portion which is continuous with the fit tubular portion so as to be substantially perpendicular to the fit tubular portion and into which a tip end portion of the high-voltage cable is inserted; and
in a state where the fit tubular portions respectively fit the first joint connector portion and the second joint connector portion, the first conductor and the second conductor are respectively connected to connecting terminals respectively provided at both end portions of the high-voltage cable.

2. The connection structure according to claim 1, wherein:
each of the cable connector portions includes a work tubular portion provided so as to extend substantially perpendicular to its base tubular portion and project in an opposite direction from which its fit tubular portion extends on a substantially same straight line as its fit tubular portion;
each work tubular portion is provided with a work opening communicating with a connection portion between one of the first and second conductors and one of the connecting terminals; and
an insulating plug is attached to each work opening.

3. The connection structure according to claim 1, further comprising:
a lower surface member configured to cover the high-voltage device box, the main transformer, and at least a part of the high-voltage cable from below; and
a fixing member configured to fix the lower surface member to a car floor structural member or a car underfloor device, wherein
at least one of the lower surface member and the fixing member includes a locking device configured to be in a locked state when the power collector is in a state capable of collecting power through the overhead contact line.

4. A railcar comprising the connection structure according to claim 1.

5. The connection structure according to claim 2, further comprising:
a lower surface member configured to cover the high-voltage device box, the main transformer, and at least a part of the high-voltage cable from below; and
a fixing member configured to fix the lower surface member to a car floor structural member or a car underfloor device, wherein
at least one of the lower surface member and the fixing member includes a locking device configured to be in a locked state when the power collector is in a state capable of collecting power through the overhead contact line.

6. A railcar comprising the connection structure according to claim 2.

7. A railcar comprising the connection structure according to claim 3.

8. A railcar comprising the connection structure according to claim 5.

* * * * *